Sept. 29, 1959　　　　　H. WEISS　　　　　2,906,945
APPARATUS FOR EFFECTING AN ELECTRIC CONTROL
IN RESPONSE TO A MAGNETIC FIELD
Filed Nov. 12, 1953　　　　　　　　　　3 Sheets-Sheet 1

Inventor:-
Herbert Weiss
By
C. M. Avy
Attorney

United States Patent Office 2,906,945
Patented Sept. 29, 1959

2,906,945

APPARATUS FOR EFFECTING AN ELECTRIC CONTROL IN RESPONSE TO A MAGNETIC FIELD

Herbert Weiss, Nurnberg, Germany, assignor to Siemens-Schuckertwerke Aktiengesellschaft, Berlin - Siemensstadt, Germany, a corporation of Germany Application November 12, 1953, Serial No. 391,647

Claims priority, application Germany November 12, 1952

14 Claims. (Cl. 324—45)

My invention relates to magnetically responsive electric apparatus whose sensing element consists of an electrically conductive member of a material that varies an electric property under the influence of a magnetic field.

It is known that bismuth or germanium changes its electric resistance when exposed to a magnetic field, and this behavior has been utilized for measuring the strength of magnetic fields. However, the sensitivity of such a device is poor because the resistance change is only slight.

It is an object of my invention, to provide magnetically responsive devices, generally of the above-mentioned type, that afford a sensitivity and a degree of electric change far superior to what has heretofore been attainable.

Another object of my invention is to make magnetically responsive apparatus of this type suitable not only for measuring a magnetic field strength but also for purposes requiring an appreciable input energy, such as regulating a magnetic field by feedback control, controlling an electric motor or other power translating device, or controlling an amplifier of appreciable current consumption in its input circuit as occurring, for instance, with magnetic amplifiers.

To achieve these objects, and in accordance with my invention, I subject to a magnetic field, to be responded to, an electric circuit member consisting essentially of a crystalline semiconductor compound of a carrier mobility of about 6000 cm.$^2$/volt second or more, and measure in the semiconductor body a change in electric property due to the magnetic field, this change being applied as a measure of the magnetic field or as a pilot magnitude for effecting a control or regulating operation. The electric property of the semiconductor thus utilized may be its electric resistance. However the Hall-effect voltage of the semiconductor may also serve as the magnetically-responsive control magnitude.

These and other objects and features of the invention will be apparent from the following description in conjunction with embodiments of the invention shown in the accompanying drawings wherein.

Figure 1:
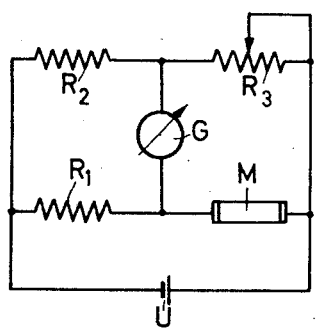
Fig. 1 is a null-indicating bridge circuit for measurement of magnetic field strength as a function of change in resistance in the semiconductor.

The invention is predicated upon the correlation existing between the carrier mobility of a semiconductor and the change in its electric properties due to the effect of a magnetic field. "Carrier mobility" is defined as the velocity of the electric charge carriers within the semiconductive substance in centimeters per second in an electric field of one volt per centimeter. The same semiconductor substance may exhibit (n-type) conductance by excess electrons or negative carriers, or it may exhibit (p-type) conductance by defect-electrons (holes) or positive carriers, depending upon the preparative treatment applied to the substance. The type of conductance depends particularly on the choice of small traces of substitutional impurities that are added to or contained in, the substance and cause lattice defects, i.e. disturb the perfection of the valence-bond structure. The term "carrier mobility" or "mobility" as used herein is generic to both types of conductance, it being only essential that either the electron mobility or the hole mobility of the semiconductive compound be about 6000 cm.$^2$/volt sec. or more.

The change in electric properties utilized for the purposes of the invention may consist in the resistance variation to which a semiconductor is subjected in the magnetic field. However, as shown below, the Hall-effect voltage occurring in a semiconductor in a magnetic field may also be utilized instead of, or in addition to, the change in resistance.

Comprehensive research has shown that the high carrier mobility required for the substances to be used according to the present invention can be expected only from chemical compounds. Germanium has a carrier mobility of up to about 3000 cm.$^2$/volts sec. and bismuth has a carrier mobility of about 5000 cm.$^2$/volt sec. In contrast thereto, carrier mobilities of 6000 cm.$^2$/volt second and more can be obtained with compounds.

On the basis of the research results, the increase in carrier mobility in semiconductor compounds can be explained as follows:

A compound, in contrast to a homopolar element, has, aside from its homopolar component, also a heteropolar component due to the chemical difference in the lattice elements (in alkali halogenide crystals the homopolar component is even practically zero and only the ionized heteropolar component is present). The superposition of homopolar and heteropolar components results in an increase in bonding energy due to the so-called resonance strengthening. This has a favorable effect upon the carrier mobility in all those cases in which the heteropolar component of a compound is so weak that its detrimental influence upon the electron mobility is not yet noticeable while at the same time the strengthening of the bond by the resonance between the homopolar and heteropolar components is appreciable.

The foregoing applies especially to binary compounds of an element of the third group ($A_{III}$) of the periodic system with an element of the fifth group ($B_V$). Compounds of the type $A_{III}B_V$ comprise substances that possess carrier mobilities of about 10,000 cm.$^2$/volt sec. or even 20,000 cm.$^2$/volt sec. and more. For instance, indium antimonide (InSb), belonging to the group of the semiconductive compounds of the type $A_{III}B_V$, exhibits an electron mobility of about 25,000 cm.$^2$/volt sec. This compound is especially well suitable for the purpose of the present invention. Another semiconductive compound of the type $A_{III}B_V$ well suitable for the invention is indium arsenide (InAs).

Various methods are available for the production of the compounds $A_{III}B_V$. For instance, the compounds may be melted together (applicable with AlSb, GaSb, InSb), or the compounds may be obtained, for instance, by reducing the oxide of the trivalent element with the aid of a stream of hydrogen loaded with the vapor of the pentavalent element (applicable with GaAs, InAs).

It is preferable to make the measuring body of a semiconductor compound whose carrier mobility greatly exceeds 6000 cm.²/volts sec., having for instance a value of more than 10,000 or even the 20,000 cm.²/volts sec.

The semiconductor body is preferably manufactured as a small rod having a cross-sectional area of a few square millimeters. The main reason therefor, among others, resides in the fact that the applicable semiconductors generally consist of crystals.

If the magnetic field is measured by the change in electric resistance occurring in the measuring body under the effect of the magnetic field, then the measurement of the change in resistance may be performed in a bridge network as shown in Fig. 1. In Fig. 1, two fixed resistors $R_1$ and $R_2$ are connected in a bridge network together with a calibrated variable resistor $R_3$ and the measuring body M. The network is connected to a voltage source U and contains a null-indicating instrument G in its measuring diagonal. The measuring operation is performed by balancing the bridge prior to placing the measuring body M into the magnetic field to be measured. That is, the variable resistor $R_3$ is first adjusted so that the instrument G shows zero. Then the measuring body M is introduced into the magnetic field to be measured. Thereafter, the resistor $R_3$ is again adjusted to return the instrument G to zero. The change in adjustment of resistance $R_3$ necessary for thus nulling the instrument is indicative of the change in resistance occurring in the measuring body M due to the magnetic field and, hence, is also a measure of the magnitude of the magnetic field.

Figure 2:
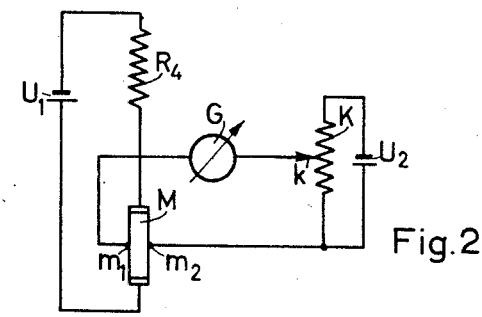
Fig. 2 is a compensating network comprising a semiconductor measuring body for measuring magnetic field strength as a function of change in Hall-effect voltage in the semiconductor.

As mentioned above, the measuring of the magnetic field may also be predicated upon the Hall-effect voltage occurring in the semiconductor measuring body within the magnetic field. For this purpose a compensating network may be used as shown in Fig. 2. According to Fig. 2 a measuring body M is series-connected with a resistor $R_4$ across a source $U_1$ of constant direct-current voltage of predetermined value. A compensating resistor K is connected across a direct-voltage source $U_2$, also of a predetermined constant voltage. Resistor K has a slidable tap contact $k$. Mounted on the measuring body at $m_1$ and $m_2$ are two Hall-electrode points in such position that they are located on an equipotential surface when the body is located outside of a magnetic field. The Hall point $m_1$ is electrically connected with the tap contact $k$ through the null instrument G, and the Hall point $m_2$ is connected with one end of the compensating resistor K.

The device according to Fig. 2 is used as follows. Before the measuring body M is subjected to the magnetic field to be measured, the slidable tap contact $k$ is adjusted so that the instrument G indicates zero. Then the measuring body M is placed within the magnetic field to be measured. According to the so-called Hall effect, this results in a rotation of the equipotential surface in the measuring body M. As a consequence, a voltage occurs between points $m_1$ and $m_2$. This voltage is a function of the magnitude of the magnetic field and is compensated for and measured by correspondingly displacing the slidable tap contact $k$ of compensating resistor K.

For accurate measuring by the method described with reference to the device of Fig. 2, it is required that the Hall voltage be of sufficiently large magnitude. This, in turn, is dependent upon the carrier mobility of the substance used for the measuring body. Consequently, in this case the increase in carrier mobility has the effect of correspondingly increasing the Hall voltage, thereby again resulting in a corresponding increase in measuring accuracy.

Figure 3:
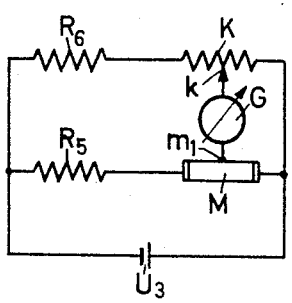
Fig. 3 is a bridge circuit for measuring magnetic field strength as a function of both change in resistance and change in Hall-effect voltage in the semiconductor.

As mentioned herein above, the measuring methods described with reference to Figs. 1 and 2 can be combined so as to utilize the sum of the Hall voltage and the voltage corresponding to the resistance change of the measuring body in the magnetic field. An embodiment of a device based upon this combined method is shown in Fig. 3. According to Fig. 3, the measuring body M is series-connected with a resistor $R_5$ across a direct-current voltage source $U_3$. A resistor $R_6$ and a compensating resistor K are series-connected across the source $U_3$ in parallel relation to the series arrangement of body M and resistor $R_5$. Compensating resistor K has a slidable tap contact $k$. The measuring body M has a Hall electrode point $m_1$ electrically connected with slidable tap contact $k$ through a null-indicating instrument G. In this embodiment, the measuring body M need only be equipped with a single Hall electrode point.

The measuring operation is performed similarly as described in connection with the embodiment illustrated in Fig. 2. That is, prior to exposing the measuring body 1 to the magnetic field, the slidable tap contact $k$ is so adjusted that the instrument G indicates zero. Thereafter, the body M is placed within the magnetic field to be measured, and the slidable tap contact $k$ is again displaced until the instrument G returns to zero. The necessary displacement of tap contact $k$ is indicative of the voltage variation occurring at point $m_1$ due to the effect of the magnetic field being measured. This voltage change at point $m_1$, as will be recognized, is due to the Hall voltage and also to the change in resistance caused in body M by the magnetic field. With a corresponding calibration of the compensating resistor K, the magnetic field strength to be measured can be read off directly. It is to be emphasized that with a device according to Fig. 3 both electrical magnitudes on which the measuring operation is predicated, that is, both the Hall voltage occurring across measuring body M and the change in electrical resistance of body M, are dependent upon the carrier mobility of the substance of which the measuring body is formed. Consequently, the device according to Fig. 3 has the advantage that the magnitude of the carrier mobility enters twice, additively, in the measuring performance.

Figure 4:
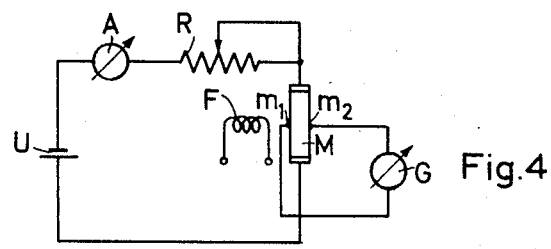
Figs. 4 and 5 show two simplified circuits for measuring a magnetic field by determining the Hall-effect voltage and the change in resistance respectively.
Figure 5:
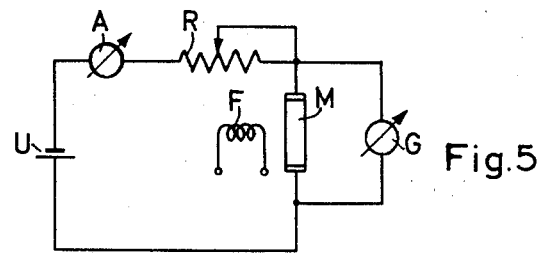

The above-described methods can be embodied in many other circuits that, for some purposes, can be simplified, for instance, as illustrated in Figs. 4 and 5.

In both figures a semiconductive sensing member M is connected in an energizing circuit comprising a voltage source U, an ammeter A and a calibrating resistor R in series with the body M. The member M is subjected to a magnetic field produced by suitable field means F, here illustrated as a magnet coil. In the embodiment of Fig. 4, the member M has two Hall electrodes $m_1$ and $m_2$ located intermediate the main or terminal electrodes at respective points that have the same electric potential when the magnetic field is absent. An instrument G, such as a millivolt meter, is connected across the Hall electrodes $m_1$ and $m_2$ to effect an indication when the magnetic field has a finite value to be determined. In the embodiment of Fig. 5 the instrument G is connected across the two main electrodes of the semiconductor member M so that the instrument responds to changes in voltage drop and hence to changes in resistance caused in member M by the effect of the magnetic field. Circuits of the type shown in Figs. 4 and 5 may also be used as input circuits for an amplifier or, generally, for effecting an electric control in response to changes in magnetic field strength.

Figure 6:
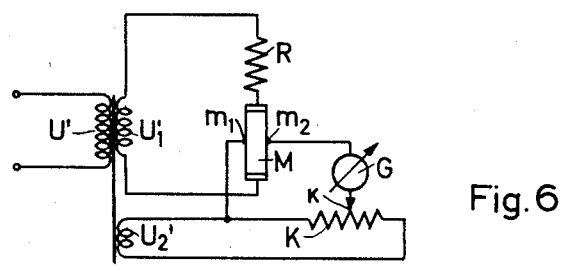
Fig. 6 illustrates a compensating network operating in response to the Hall-effect voltage, this network being similar to that of Fig. 2 but operating with alternating voltage.

Devices according to the invention may also be operated with alternating current. In this case, the measuring instruments may consist of a vibration-type galvanometer or an electronic-tube amplifier. For instance, the embodiment shown in Fig. 6 is largely similar to that illustrated in Fig. 2, the same reference characters being used in both figures, but the energizing circuit as well as the compensating circuit in Fig. 6 are energized by alternating voltage from respective secondary windings $U_1'$ and $U_2'$ of a transformer whose primary winding $U'$ is to be connected to an alternating-current line.

Due to the fact that a magnetically responsive sensing element as to be used according to the invention provides electric variations of a relatively large magnitude, such devices are well suitable for control and regulating purposes and offer the advantage that they can readily be combined with amplifiers, such as magnetic amplifiers, that require a relatively large input energy as compared with electronic-tube amplifiers having high-ohmic input circuits of negligible energy requirements. However, also when used with electronic or relay amplifiers, a device according to the invention is advantageous because it then permits reducing the number of amplifying stages.

Figure 7:
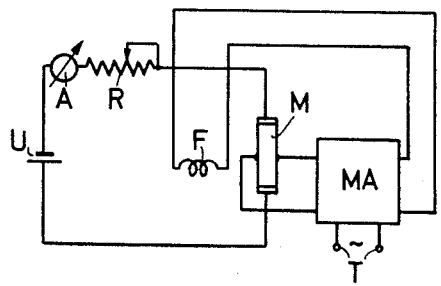
Figs. 7, 8 and 9 show three different devices for regulating a magnetic field by a feedback magnitude derived from the field to be regulated.
Figure 8:
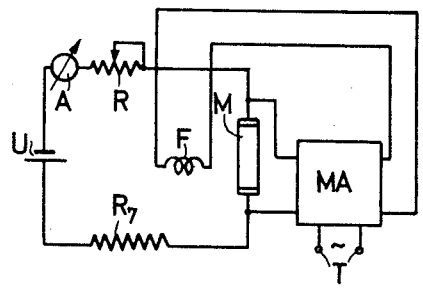
Figure 9:
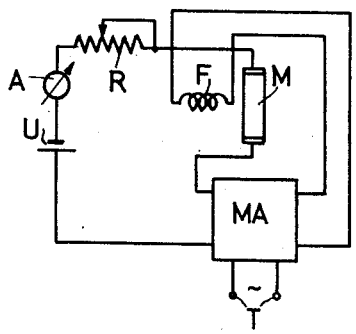

Three examples of amplifying apparatus are illustrated in Figs. 7 to 9 in conjunction with systems for stabilizing a magnetic field.

According to each of Figs. 7, 8 and 9, semiconductive sensing member M is connected with a voltage source U in series with an ammeter A and a resistor R. In the embodiment of Fig. 7, two Hall electrodes of member M are connected to the input terminals of a magnetic amplifier MA energized at terminals T from an alternating-current source. The output circuit of the magnetic amplifier MA includes a winding F for producing a magnetic field to which the semiconductor member M is subjected. Any change in field strength causes the semiconductor member to generate a voltage between its Hall electrodes, and this voltage, amplified by the magnetic amplifier MA, has the effect of varying the excitation of the winding F in the direction and by the amount needed to maintain the field strength constant at a predetermined magnitude.

The embodiment according to Fig. 8 operates in a similar manner except that the input terminals of the magnetic amplifier MA are connected across the main electrodes of the semiconductor member M so that the amplifier is controlled by the resistance variation or change in voltage drop occurring across member M as an effect of the magnetic field. In Fig. 8 the semiconductor member M is shown series connected with a resistor $R_7$ in addition to the calibrating resistor R.

In the embodiment of Fig. 9, a regulation for constancy of the magnetic field is also effected in a manner similar to Fig. 7 except that the semiconductor member M is series connected in the input circuit of the magnetic amplifier MA.

Figure 10:
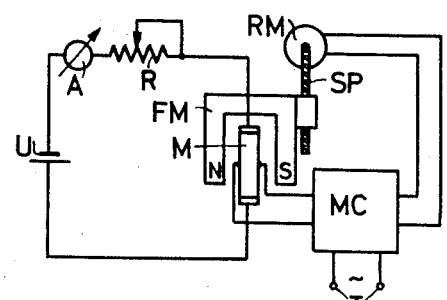
Figs. 10 and 11 show respective circuits of motor-driven devices operating in response to a magnetic field for controlling or regulating a positional magnitude.
Figure 11:
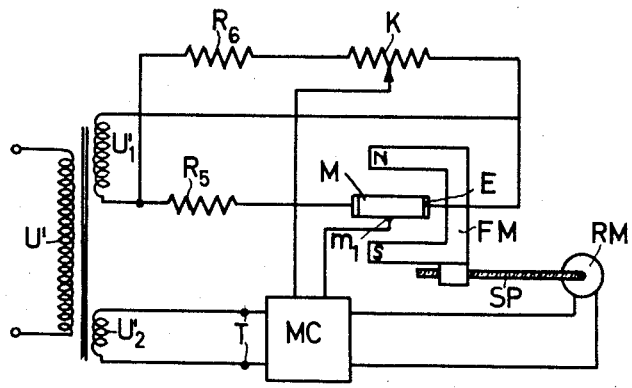

In the embodiments of Figs. 10 and 11, wherein the same reference characters are applied as in Figs. 4 to 9 for similar respective circuit elements, the magnetic variation of the electric behavior of the semiconductor member M is utilized for positional regulation. According to Fig. 10 a semiconductor member M with two Hall electrodes is disposed within the field of a magnet system FM which is displaceable for varying the field strength effective upon the semiconductor substance. The displacement of system FM is controlled by a reversible motor RM schematically shown to be mechanically connected with system FM by a screw spindle SP. The Hall-electrode circuit is connected to the input terminals of a motor control unit MC. The control unit MC may consist of an amplifier containing electronic tubes, transistors, relays, a magnetic amplifier, dynamo-electric amplifying machinery or any other suitable means that provide an output current of the polarity and magnitude depending upon the polarity and magnitude of the input voltage or current. When the system FM is in the correct position, the Hall voltage applied to the input terminals of the motor-controlled unit MC is balanced so that the motor RM is deenergized. Any departure of the system FM from the correct position has the effect of changing the Hall-effect voltage in one or the other direction and thus causes the motor RM to displace the system FM in the direction and to the extent needed to eliminate the positional inaccuracy. It will be recognized that in this manner the invention may advantageously be utilized for effecting positional control and regulating operations.

The embodiment of Fig. 11 includes a balanceable measuring network of the type shown in Fig. 3, except that the network is energized by alternating voltages from respective secondaries $U_1'$ and $U_2'$ of a transformer whose primary $U''$ is to be connected to an alternating-current line. In all other respects, the embodiment combines the features of Figs. 3 and 10 as will be apparent from the analogously applied reference characters. It will be recognized that the input voltage impressed upon the motor control unit MC depends additively upon two variable component voltages occurring at the semiconducting sensing member M, namely upon the Hall-effect voltage between the Hall electrode $m_1$ and the main electrode E and upon the resistance-dependent voltage drop between the just-mentioned two electrodes. When the resultant of these component voltages has the correct value, as determined by the setting of rheostat K, the input voltage of unit MC is zero and the motor RM is at rest. When the resultant sensing voltage departs from the correct value, a differential input voltage of finite magnitude is impressed across the input terminals of unit MC and causes the motor RM to run in the proper direction until the system FM is displaced to the position at which the correct value of the resultant sensing voltage is reestablished.

It will be understood by those skilled in the art that the invention permits of various embodiments, modifications and uses other than those herein specifically described, without departing from the essential features of the invention as set forth in the claims annexed hereto.

I claim:

1. Apparatus for effecting a control in dependence upon a magnetic field, comprising an electric circuit member to be subjected to the magnetic field, said circuit member having a crystalline body of semiconductor compound of a minimum carrier mobility of about 6000 $cm.^2$/volt second, said member having on said body two main electrodes and a Hall electrode, said Hall electrode being located at a point of potential which is intermediate those of said main electrodes at zero strength of said field, an electric circuit comprising current supply means and being connected across said two main electrodes to pass current through said member, and an electric output circuit to be controlled, said output circuit being connected between said Hall electrode and one of said main electrodes and responsive cumulatively to the Hall-effect voltage and the resistance change caused in said body by said field and said current.

2. Electric control apparatus, comprising a magnet structure having a magnetic field, a semiconductor member having a body consisting of semiconductor compound of a minimum carrier mobility of about 6000 $cm.^2$/volt second and having two terminal electrodes and an intermediate Hall electrode on said body, said body being disposed in said magnetic field and said terminal electrodes being spaced from each other and from said Hall electrode in a direction intersecting the direction of said magnetic field, a bridge network having two parallel branches and having an output diagonal, one of said two branches including said semiconductor member and extending through said two terminal electrodes to pass current through said member, said diagonal extending from said Hall electrode to a circuit point of said other branch, and a voltage-responsive device connected in said diagonal.

3. Electric control apparatus, comprising magnetic field means having a control coil for varying the field strength of said field means, an electric circuit member consisting of a semiconductor compound having a minimum carrier mobility of about 6000 cm.$^2$/volt second, said circuit member being disposed in the field of said magnetic field means whereby said member is subjected to electric change in response to changes in said field strength, circuit means including said member and electrically connected with said control coil for controlling said field strength in dependence upon said change.

4. Electric control apparatus, comprising a magnetic field structure and a semiconductor member disposed in the field of said structure, a field control coil on said structure for varying the strength of said magnetic field relative to said semiconductor member, said member having a crystalline body of semiconducting compound of a minimum carrier mobility of about 6000 cm.$^2$/volt second and having two electrodes spaced from each other in a direction intersecting the direction of said field, electric current supply means connected to said electrodes for passing current through said member whereby said member is subjected to electric variation dependent jointly upon said magnetic field and said current, and circuit means including said member and connected to said field control coil for controlling said field strength in accordance with said variation.

5. Electrical apparatus, comprising magnetic field means, a semiconductor member disposed in the magnetic field of said means and having a crystalline body of semiconductor compound of a minimum carrier mobility of about 6000 cm.$^2$/volt second, said member having on said body two terminal electrodes spaced from each other in a direction transverse to said field and having Hall electrode means located between said terminal electrodes, said field means comprising a control coil for varying the strength of said magnetic field relative to said member, a current supply circuit connected to said terminal electrodes for passing current through said member, and an output circuit connected to said Hall electrode means to provide a variable voltage dependent upon said field control means, and circuit means connecting said coil with said output circuit for exciting said coil in dependence upon said voltage.

6. An apparatus for controlling an electric circuit in dependence upon a magnetic field, comprising a member subjected when in operation to the magnetic field, said member being a crystalline semiconductor compound having a carrier mobility of at least 6,000 cm.$^2$/volt sec., said compound being taken from the group consisting of InAs and InSb, electric current supply terminals connected to the member at mutually displaced parts thereof, current supply means connected to said terminals, means for subjecting the member to a magnetic flux transversely of the current path between said supply terminals, and an electrical circuit to be controlled, the latter circuit including said member so as to be responsive to electric change in said member due to said field.

7. An apparatus for controlling an electric circuit in dependence upon a magnetic field, comprising a member subjected when in operation to the magnetic field, said member being a crystalline semiconductor compound having a carrier mobility of at least 6,000 cm.$^2$/volt sec., said compound being taken from the group consisting of InAs and InSb, electric current supply terminals connected to the member at mutually displaced parts thereof, current supply means connected to said terminals, means for subjecting the member to a magnetic flux transversely of the current path between said supply terminals, and an electrical circuit to be controlled, the latter circuit including said member as a resistive element thereof so as to be responsive to change in resistance of said member due to said field.

8. An apparatus for controlling an electric circuit in dependence upon a magnetic field, comprising a member subjected when in operation to the magnetic field, said member being a crystalline semiconductor compound having a carrier mobility of at least 6,000 cm.$^2$/volt sec., said compound being taken from the group consisting of InAs and InSb, electric current supply terminals connected to the member at mutually displaced parts thereof, current supply means connected to said terminals, means for subjecting the member to a magnetic flux transversely of the current path between said supply terminals, a Hall voltage electrode on said member spaced from said supply terminals, and an electrical circuit to be controlled, the latter circuit including said member and said Hall voltage electrode so as to be responsive to electric change in said member due to said field.

9. The apparatus of claim 6, the compound being InAs, having a carrier mobility of at least 10,000.

10. The apparatus of claim 6, the compound being InSb having a carrier mobility of at least 10,000.

11. An apparatus for controlling an electric circuit in dependence upon a magnetic field, comprising a member subjected when in operation to the magnetic field, said member being a crystalline semiconductor compound having a carrier mobility of at least 6,000 cm.$^2$/volt sec., electric current supply terminals connected to the member at mutually displaced parts thereof, current supply means connected to said terminals, means for subjecting the member to a magnetic flux transversely of the current path between said supply terminals, two Hall voltage electrodes on said member spaced from said supply terminals, and an electrical circuit to be controlled, the latter circuit including said Hall voltage electrodes so as to be responsive to electric change in said member due to said field.

12. An apparatus for controlling an electric circuit in dependence upon a magnetic field, comprising a member subjected when in operation to the magnetic field, said member being a crystalline semiconductor compound having a carrier mobility of at least 6,000 cm.$^2$/volt sec., said compound being a binary semiconductor compound of respective elements from the third and fifth groups of the periodic system, electric current supply terminals connected to the member at mutually displaced parts thereof, current supply means connected to said terminals, means for subjecting the member to a magnetic flux transversely of the current path between said supply terminals, two Hall voltage electrodes on said member spaced from said supply terminals, and an electrical circuit to be controlled, the latter circuit including said Hall voltage electrodes so as to be responsive to electric change in said member due to said field.

13. The apparatus defined in claim 11, the compound being indium arsenide, of the formula InAs, having a carrier mobility of at least 10,000.

14. The apparatus defined in claim 11, the compound being indium antimonide, of the formula InSb, having a carrier mobility of at least 10,000.

References Cited in the file of this patent

UNITED STATES PATENTS

| 1,998,952 | Edgar et al. | Apr. 23, 1935 |
| 2,551,265 | Hansen | May 1, 1951 |
| 2,562,120 | Pearson | July 24, 1951 |
| 2,649,569 | Pearson | Aug. 18, 1953 |
| 2,663,843 | Wickerham et al. | Dec. 22, 1953 |
| 2,798,989 | Welker | July 9, 1957 |

FOREIGN PATENTS

| 659,653 | Great Britain | Oct. 24, 1951 |